United States Patent
Le Brusq et al.

(10) Patent No.: US 9,103,212 B2
(45) Date of Patent: Aug. 11, 2015

(54) METHOD FOR PROTECTING THE PASSAGE OF AIR IN A DRIVE PART COUPLING IN AN UNPROTECTED ENVIRONMENT, COUPLING FOR IMPLEMENTATION, AND ROTOR LINE FITTED WITH SUCH COUPLINGS

(75) Inventors: Pascal Pierre Le Brusq, Idron (FR); Jean-Philippe Ousty, Soumoulou (FR); Lionel Scuiller, Billere (FR)

(73) Assignee: TURBOMECA, Bordes (FR)

( * ) Notice: Subject to any disclaimer, the term of this patent is extended or adjusted under 35 U.S.C. 154(b) by 666 days.

(21) Appl. No.: 13/502,471

(22) PCT Filed: Oct. 13, 2010

(86) PCT No.: PCT/FR2010/052170
§ 371 (c)(1),
(2), (4) Date: Apr. 17, 2012

(87) PCT Pub. No.: WO2011/051592
PCT Pub. Date: May 5, 2011

(65) Prior Publication Data
US 2012/0201658 A1 Aug. 9, 2012

(30) Foreign Application Priority Data
Oct. 30, 2009 (FR) ...................................... 09 57653

(51) Int. Cl.
*F01D 5/06* (2006.01)
*F01D 5/02* (2006.01)
(Continued)

(52) U.S. Cl.
CPC ............... *F01D 5/066* (2013.01); *F01D 5/025* (2013.01); *F01D 11/001* (2013.01);
(Continued)

(58) Field of Classification Search
CPC ....... F01D 5/025; F01D 5/066; F01D 11/001; F04D 29/083; F04D 29/584; F04D 29/161; F16D 1/033; F16D 2300/021; F16D 2011/008
USPC ........ 415/115, 116, 180, 198.1, 199.1, 199.2, 415/199.4, 199.5; 416/95, 96 R, 96 A, 97 R, 416/198 R, 198 A, 200 R, 200 A, 201 R, 416/201 A, 244 A; 464/149, 157; 403/364
See application file for complete search history.

(56) References Cited

U.S. PATENT DOCUMENTS 2,741,454 A * 4/1956 Eppley ...................... 416/244 A
5,205,716 A   4/1993 Georges et al.
(Continued)

FOREIGN PATENT DOCUMENTS

| DE | 195 18 678 | 10/1996 |
| EP | 0 479 632 | 4/1992 |
| EP | 1 193 370 | 4/2002 |

(Continued)

OTHER PUBLICATIONS

International Search Report Issued Jan. 28, 2011 in PCT/FR10/52170 Filed Oct. 13, 2010.

*Primary Examiner* — Christopher Verdier

(74) *Attorney, Agent, or Firm* — Oblon, McClelland, Maier & Neustadt, L.L.P.

(57) ABSTRACT

A method to prevent blockage of air passages in curvic couplings between drive parts and to prevent potential damage to the drive parts during weakening of protective elements. To this end, axial abutments are formed by ring gears of the curvic couplings. A coupling includes two rings, each ring being on the end of one drive part and engaged with the other so as to transmit to the drive part a rotation around a central axis while allowing air to pass between male and female portions of the teeth of the rings behind a bearing area. The rings are extended in an at least partially radial manner relative to each other to form an outer ring extension and an inner ring extension respectively facing elements surrounding the drive part that are mounted onto the other ring. The rotor lines can be used in turbine engines.

9 Claims, 5 Drawing Sheets

(51) Int. Cl.
*F01D 11/00* (2006.01)
*F04D 29/08* (2006.01)
*F04D 29/16* (2006.01)
*F04D 29/58* (2006.01)
*F16D 1/033* (2006.01)
*F16D 11/00* (2006.01)

(52) U.S. Cl.
CPC ............ *F04D 29/083* (2013.01); *F04D 29/161* (2013.01); *F04D 29/584* (2013.01); *F16D 1/033* (2013.01); *F16D 2011/008* (2013.01); *F16D 2300/021* (2013.01)

(56) References Cited

U.S. PATENT DOCUMENTS

| | | | |
|---|---|---|---|
| 5,555,721 A * | 9/1996 | Bourneuf et al. ............ 415/115 |
| 5,628,621 A | 5/1997 | Toborg |
| 5,799,766 A | 9/1998 | Link et al. |
| 6,364,634 B1 | 4/2002 | Svihla et al. |
| 6,672,966 B2 | 1/2004 | Muju et al. |
| 2005/0196088 A1 | 9/2005 | Charier et al. |

FOREIGN PATENT DOCUMENTS

EP          1 577 495          9/2005

* cited by examiner

METHOD FOR PROTECTING THE PASSAGE OF AIR IN A DRIVE PART COUPLING IN AN UNPROTECTED ENVIRONMENT, COUPLING FOR IMPLEMENTATION, AND ROTOR LINE FITTED WITH SUCH COUPLINGS

TECHNICAL FIELD

The invention concerns a method for protecting the passage of air in a drive part coupling of turbomachines such as centrifugal compressor impellers, axial compressors or turbine wheels—in an unprotected environment. The environment of a device is called "unprotected" if, under abnormal operating conditions of the device (also referred to as fault conditions), it is liable to create obstructions of said passage and/or to damage drive parts by movement or detachment of elements, in particular protection elements generally fastened to the annular portions of parts by shrink-fitting.

The present invention is also directed to couplings used by this method and turbomachine transmission rotor lines or shafts equipped with such couplings.

The invention relates to toothed coupling mechanisms for assembling rotation drive parts in motors, such as centrifugal compressors, turbine wheels or couplings in transmission or rotor lines in turbomachines. These parts are subject to high stresses at the same time as allowing flow of air necessary for secondary air flows.

This type of coupling is also known as a "curvic coupling", which means "straight spur gear coupling".

PRIOR ART

Such couplings between impellers and/or compressor wheels and/or turbine wheels are known for example from the patent documents U.S. Pat. No. 5,628,621 and U.S. Pat. No. 6,672,966. In those documents, the curvic couplings are not explicitly exposed to an environment liable to contain elements liable to be detached or moved to obstruct the passage of air between the toothed rings. Moreover, no means are provided for protecting an air passage in the gears. To the contrary, the document U.S. Pat. No. 5,628,621 provides for the introduction of a seal into an annular housing provided on the toothed rings.

Now, impellers or compressor or turbomachine wheels or turbines may be equipped with annular protection elements, for example thermal protection elements, or junction elements between rotors and stators. These protection parts take the form of sheaths, plates or annular seals. These parts are generally shrink-fitted to the faces of the rotors (impellers or wheels) to be protected.

These internal protection elements of impellers or turbine or compressor wheels are, in the case of curvic coupling connections, extended by tongues for protecting the couplings which are particularly beneficial if the shrink-fit should come apart. These tongues have an axial length, an annular width and a radial distance from the couplings and the drive parts such that the passage of air in the coupling, for example from a centripetal secondary air system, is preserved without backflow or disturbance.

Under abnormal conditions of use the shrink-fit may come apart. Such protection parts may then cause blocking of the flow of air provided at the level of the couplings. As shown in the FIG. 1 diagram—partially representing a curvic coupling 10 between impellers 12 and 14 of helicopter turbomachine compressors—the sheath 16 provided with tongues 18 distributed over its circumference and the labyrinth seal 19 are shrink-fitted to the impellers 12 and 14, respectively. The elements represented are circular about the central axis X'X.

Should the shrink-fit come apart, the sheath 16 or the seal 19 comes to obstruct the passage section of the secondary flow of air Fs, which leads to deterioration or even loss of the functions provided by that secondary flow of air, for example pressurization, cooling, sealing, etc.

Moreover, the tongues 18 project significantly from the facing face of the impeller 12, which creates a problem for manipulation of the assembly of the impeller 12 and its sheath 16, for example when placing that assembly resting on the tongues on a plane conveying surface or on offering this assembly up to the impeller 14: the tongues may then be damaged or damage critical areas because the sheath is pressed into the impeller.

Moreover, the detached parts 16 and 19 may strike and damage the impellers 14 and 12, respectively. In particular, the seal 19 may come into contact with an area 13 of curvature of the impeller 12 that is critical for its longevity. A crack may begin to form and a possible consequence is fracture of the part after propagation of the crack.

SUMMARY OF THE INVENTION

The invention aims to prevent these problems of obstruction of the air passages of the secondary air system in curvic couplings between drive parts and potential damage of those drive parts by providing for the toothed rings of the curvic couplings to form axial abutments.

To be more precise, the invention provides a method for protection of air passages in a straight spur gear coupling between rotors of drive parts associated with shrink-fitted elements. The coupling drives the parts in rotation about a central axis by mutual meshing of extremities of these parts, at the same time as allowing air to pass. More particularly, a coupling extremity is at least partially radially lengthened relative to the other extremity so as to form at least one external or internal extension facing an element enveloping the drive part mounted on the other extremity. The terms "external" and "internal" qualify the extreme peripheries—relating to a circular element extending radially relative to the central axis—located closest to and farthest from the central axis, respectively.

In the event of axial detachment of the shrink-fitted elements—which may be internal or external elements—the internal and/or external extension or extensions of the toothed rings form abutments leaving free the radial flow of air through the coupling and preventing axial impact of the detached elements. Moreover, the present solution makes it possible to dispense with the presence of protective tongues, which facilitates manipulation of the impeller and mating of the rotors.

In preferred embodiments there are formed:
at least one external radial extension and at least one internal radial extension;
a single external extension and a single internal extension, the extensions being at least partially circular about the central axis.

The invention also provides the straight spur gear coupling between rotors of drive parts of a turbomachine using the method. That coupling includes two rings of teeth, each ring being at the extremity of one drive part and meshing with the other so as to transmit to it drive in rotation about a central axis whilst allowing air to pass between the grooves of the female portions and the extremities of the male portions of the teeth. The coupling more particularly includes at least one ring extended at least partially in the radial direction relative to the other, so as to form at least one external or internal ring extension respectively facing an element enveloping the drive part mounted on the other ring.

In particular embodiments:
- each ring has at least one extension, the or each extension being external and internal;
- one ring has an external extension and the other ring has an internal extension;
- the extended toothed ring of one drive part is rigidly fastened to a protective sheath that features axial tongues of a length substantially equal to or greater than the axial depth of the air passage at the level of the grooves between male and female portions of the teeth;
- the extensions are located on a sector, in plane bearing engagement or on a surface of revolution about the central axis.

The invention further provides a turbomachine shaft line or rotor line including turbines for transformation of energy from combustion and air compressors intended for combustion, the rotor line transmitting the energy supplied by the turbines to the compressors. According to the invention the rotor line includes an appropriate number of couplings between two rotors of compressors and turbines of the turbomachine.

BRIEF DESCRIPTION OF THE FIGURES

Other advantages and features of the invention may become apparent in the following detailed description, given with reference to the appended figures, in which.

DETAILED DESCRIPTION

Figure 1:
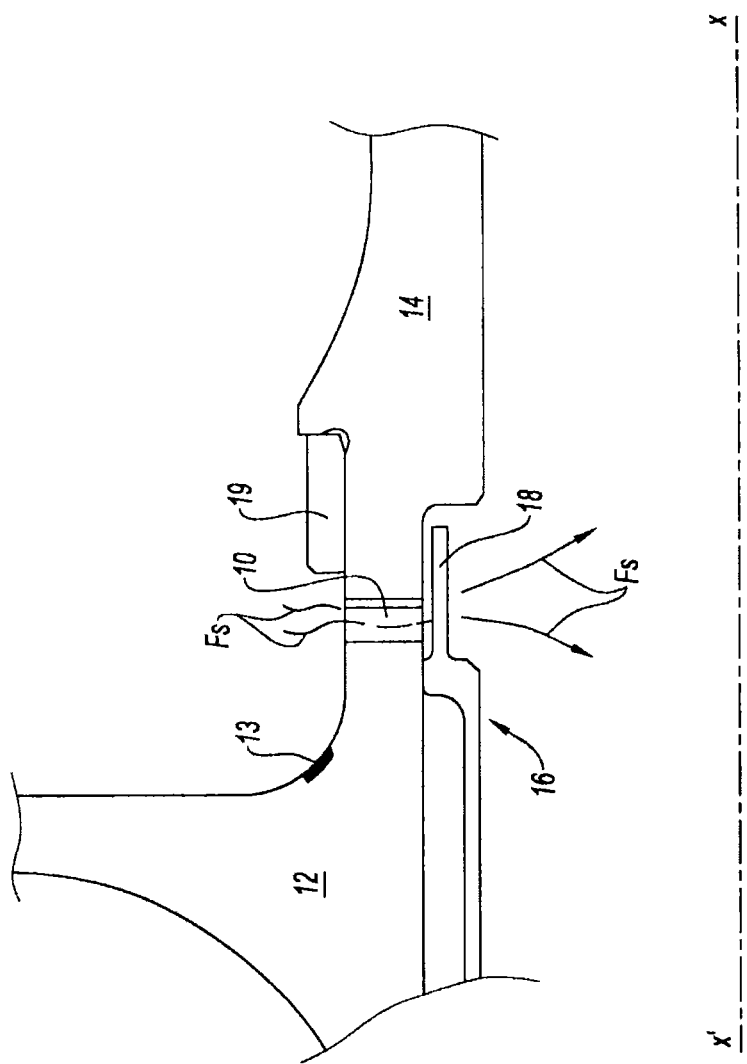
FIG. 1 is a partial diagrammatic sectional view of a prior art coupling of compressor impellers in a turbomachine (already commented on)
Figure 2:
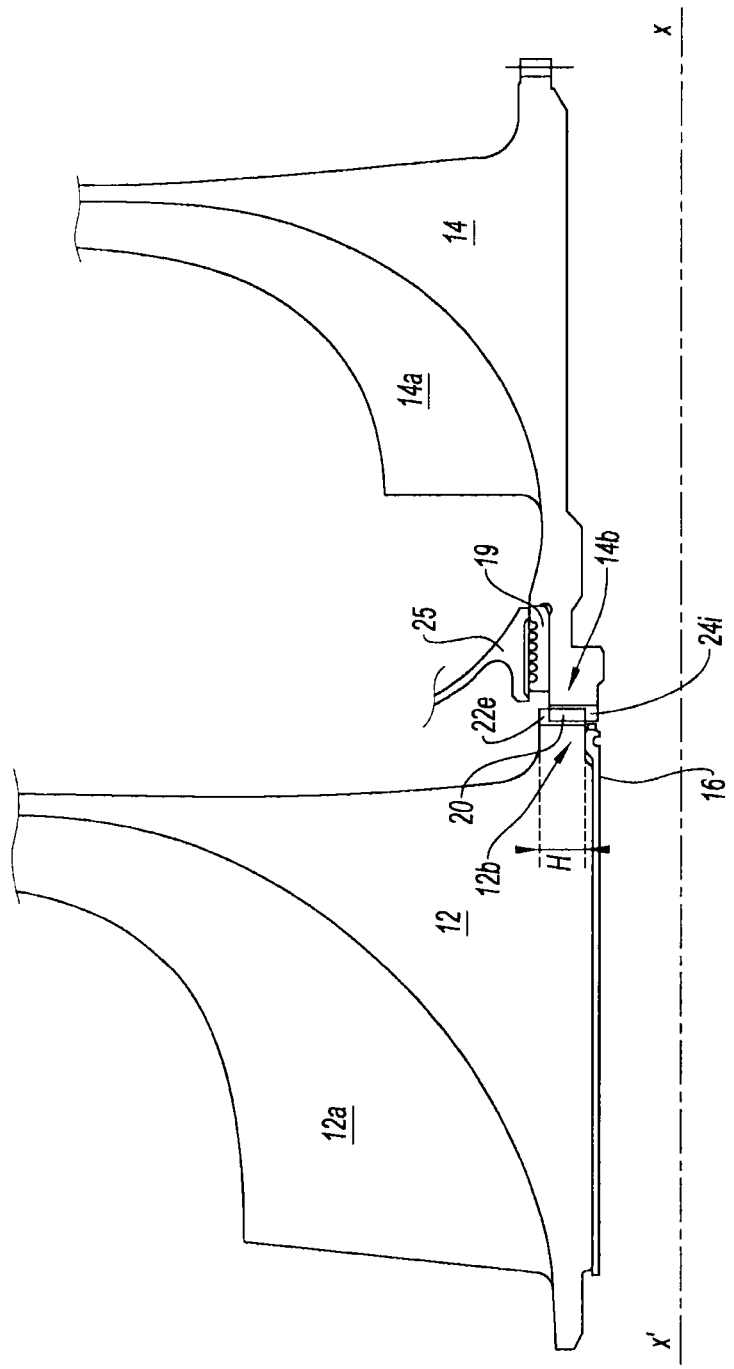
FIGS. 2 and 2a are a diagrammatic partial sectional view and a view to a larger scale of an example of an impeller coupling of the invention.
Figure 2A:
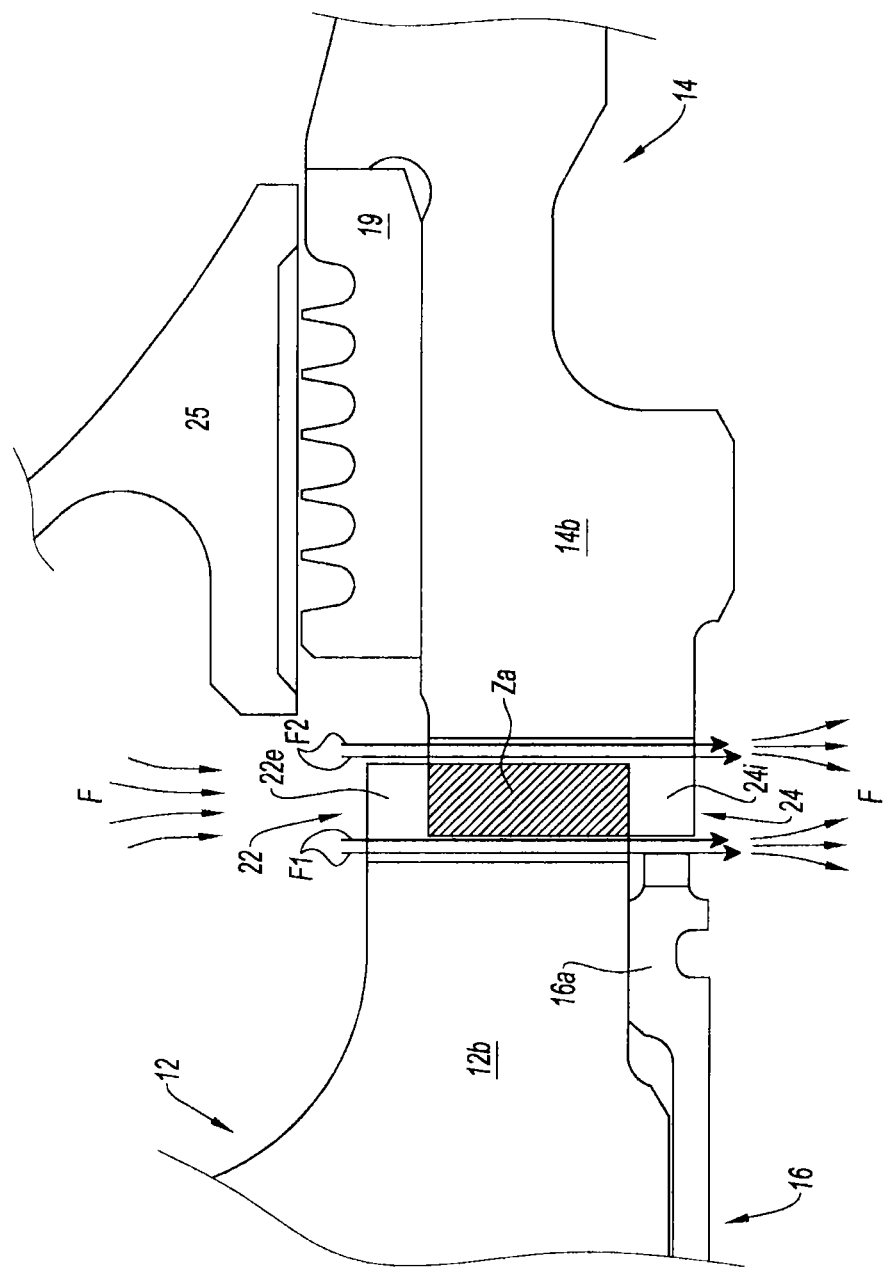

Referring to the diagrammatic sectional view in FIG. 2, and the corresponding view to a larger scale in FIG. 2a, elements repeated from or corresponding to those in FIG. 1 use the same reference symbols. The impellers 12 and 14 are provided with fins 12a and 14a, also called blades or vanes, and mesh with each other by means of a coupling 20 of the invention including two toothed rings. These rings have an external extension 22e and an internal extension 24i facing the central axis X'X. This coupling is described in more detail with reference to FIG. 3.

Moreover, the sheath 16 is shrink-fitted onto a portion of the internal cylindrical wall of the impeller 12 and the neck 12b of the impeller that the toothed ring forms at its extremity. The internal extension 24i of the other toothed ring formed at the extremity of the neck 14b of the impeller 14 forms an axial abutment for the sheath 16 if that sheath becomes detached.

In a similar manner, the labyrinth seal 19—shrink-fitted onto the external wall of the neck 14b to make the seal with the stator 25—comes to abut on the external extension 22e of the ring of the impeller 12 should the seal become detached.

Globally, the facing cylindrical necks 12b and 14b on which the toothed rings 22 and 24 are formed have substantially the same radial thickness but reduced inside and outside diameters in one impeller 14 relative to the other impeller 12. The teeth of the rings mesh in bearing engagement over a common height H sufficient to produce meshing that is sufficiently reliable given technological constraints and operating conditions. The coupling 20 between the rings is then reflected in a corresponding radial reduction of the rings so that the external perimeter of the ring of the impeller 12 features a radial protuberance 22e relative to the ring of the impeller 14 and the internal perimeter of the other ring features an internal radial protuberance 24i relative to the first.

FIG. 2a shows in particular and shaded the bearing area Za between the teeth of the rings 22 and 24 and the flow of secondary air F passing between the arrows F1 and between the arrows F2 in this figure. This flow F, which is a centripetal flow in the example shown, passes out of the bearing areas Za. To be more precise, as seen in the FIG. 3 view from above, the flow F passes between on the one hand the groove bottoms G2 and G4 of the female portions of the teeth D2 and D4 of the toothed rings 22 or 24 and on the other hand the extremities M4 and M2 of the male portions of the facing teeth 24 or 22, respectively, of the other ring.

The distance between the groove bottoms and the extremities of the facing teeth is referred to hereinafter as Δ, corresponding to the passage section of the flows F1 and F2. This view from above also shows an edge portion of the labyrinth seal 19.

Figure 4:
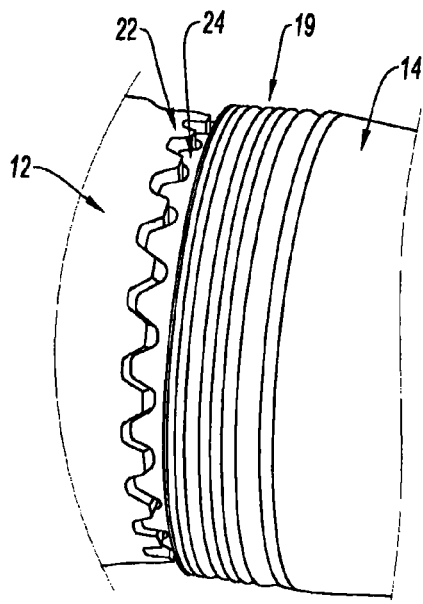
FIGS. 4 and 4a are an external perspective view of the coupling between two turbomachine rotors including a coupling as shown in FIG. 2 and a partial view to a larger scale showing the positioning between a labyrinth seal and the facing extended toothed ring that may serve as an abutment for this seal.
Figure 4A:
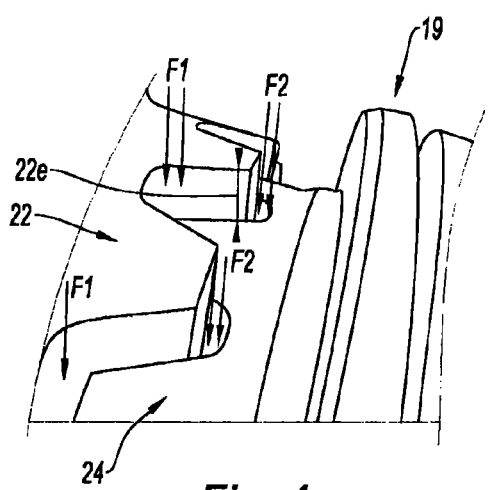

In the external front view and the view to a larger scale of FIGS. 4 and 4a, respectively, are seen the position of the labyrinth seal 19 shrink-fitted onto the neck of the impeller 14 that terminates in the ring 24, facing the toothed ring 22 of the extended impeller 12. The ring 22 may serve as an abutment for the seal 19 should it become detached. The labyrinth seal 19 can then obstruct only the portion F2 of the flow of air because it is immobilized by the extension 22e of the ring 22. The other portion F1 of the flow is not disturbed.

To prevent partial obstruction of the flow of air, the seal could feature annular tongues distributed at its perimeter. Such a solution is adopted on the sheath 16. Referring to FIG. 2a and to the internal representations to a larger scale and in more detail of FIGS. 5a to 5c viewed at different angles, the residual tongues 18r project from the fixing bead 16a at the extremity of the sheath 16.

Figure 3:
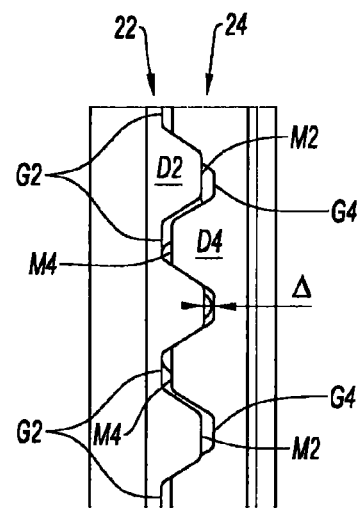
FIG. 3 is a detailed radial view from outside the part of the meshing between the teeth of the rings, showing the air passages.
Figure 5C:
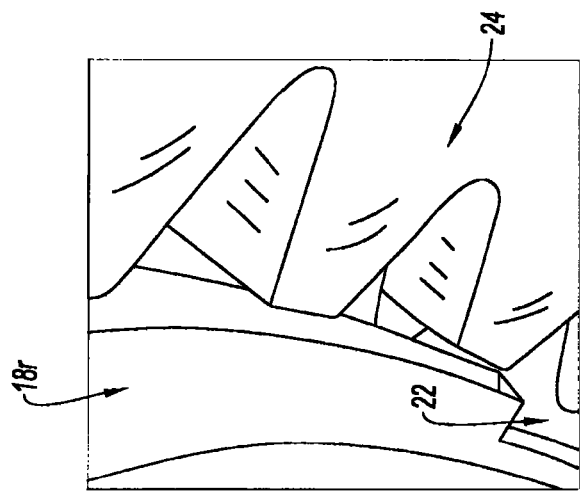
FIGS. 5a to 5c are three internal views in different orientations of the shaft including an impeller sheath and the facing extended toothed ring that may serve as an abutment for that sheath.
Figure 5B:
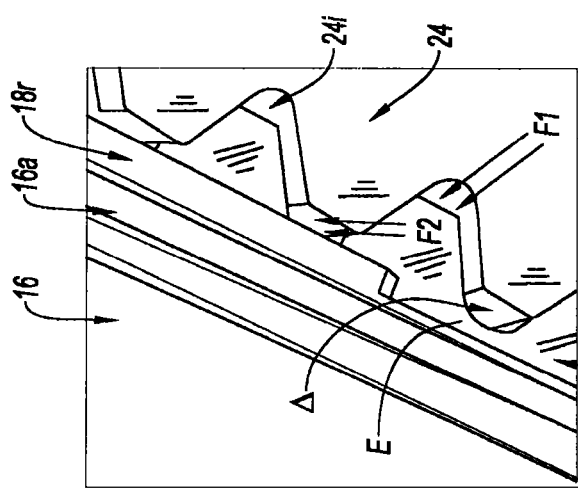
Figure 5A:
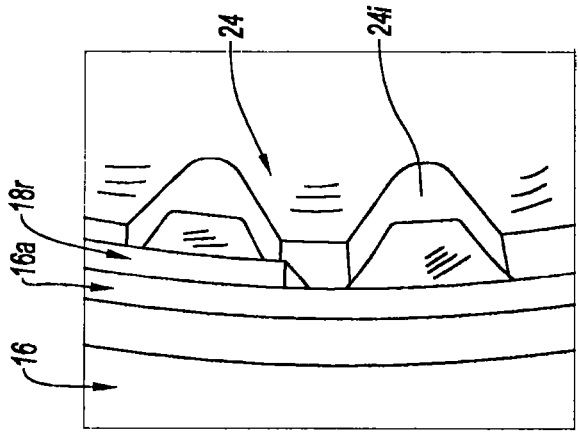

The prior art tongues 18 (cf. FIG. 1) have thus been cut so that their remaining length is at least equal to the axial distance Δ corresponding to the section of the flow F1 (cf. FIG. 3). Accordingly, should the shrink-fit come apart, the flow of air is substantially undisturbed: the spaces E between the tongues 18r allow the portion F2 of the flow to pass and the portion F1 of the flow is protected by the internal extension 24i of the ring 24. In FIGS. 5a to 5c, the discontinuity of the residual tongues 18r produces the space E created between a tongue 18r, the next tongue (not shown) and the extremity of the sheath 16.

The invention is not limited to the embodiment described and represented. For example, it is possible to provide male portions of teeth of rings having abutment axial forward projections at their external or internal extremities, in such a manner as to prevent blocking of the flow of air passing between these male portions and the female portions of the other ring.

It is equally possible to provide teeth with other shapes, external and internal radial extensions of the coupling of different amplitude, different groove bottom distances to allow flows of air of different section to pass or the presence of a single external or internal extension. Depending on the configuration, the coupling may be of limited range or need not be circular, for example consisting in plane bearing engagement.

In other embodiments the rings have teeth with different configurations, as much in shape as in axial or radial depth.

The invention claimed is:

1. A method for protecting passage of air in a coupling between rotors of drive parts associated with enveloping elements, wherein the coupling drives the drive parts in rotation about a central axis by mutual meshing of extremities of the drive parts, at a same time as allowing air to pass, the method comprising:
    extending one extremity of the coupling at least partly radially relative to one other extremity of the coupling, so as to form at least one external extension or internal extension fitted to form an abutment axially facing one of the enveloping elements that is enveloping one of the drive parts mounted on the other extremity and that is configured to abut against said external extension or said internal extension.

2. The protection method as claimed in claim 1, wherein at least one external radial extension and at least one internal radial extension are formed.

3. The protection method as claimed in claim 2, wherein a single external radial extension and a single internal radial extension are formed, the radial extensions being at least partially circular about the central axis.

4. A straight spur gear coupling between the rotors of the drive parts of a machine employing the method as claimed in claim 1, comprising:
    two rings of teeth, each ring being at the extremity of one of the drive parts and meshing with another of the drive parts so as to transmit to each ring driven rotation about the central axis whilst allowing the air to pass between grooves of female portions and extremities of male portions of the teeth; and
    at least one of the rings is extended at least partially in a radial direction relative to another one of the rings, so as to form at least one external ring extension or internal ring extension respectively axially facing one of the enveloping elements that is mounted on the another one of the rings.

5. The straight spur gear coupling as claimed in claim 4, wherein each ring includes at least one of the ring extension, the ring extensions being external and internal.

6. The straight spur gear coupling as claimed in claim 5, wherein one of the rings includes a single circular external extension and another one of the rings includes a single circular internal extension.

7. The straight spur gear coupling as claimed in claim 4, wherein the extended toothed ring of one of the drive parts is rigidly fastened to a protection sheath that includes axial tongues of a length substantially equal to or greater than an axial depth of an air passage at a level of the grooves between the male and female portions of the teeth.

8. The straight spur gear coupling as claimed in claim 4, wherein the ring extensions are localized, in a form of plane bearing engagement or circular about the central axis.

9. A turbomachine rotor line including turbines for transformation of energy by combustion and compressors of air intended for combustion, comprising:
    a plurality of couplings between two of the rotors of the compressors and the turbines of the turbomachine, each of the couplings being the straight spur gear coupling as claimed in claim 4.

* * * * *